United States Patent [19]
Aoki et al.

[11] 3,904,424

[45] Sept. 9, 1975

[54] ALKALI RESISTANT GLASSY FIBERS

[75] Inventors: Susumu Aoki; Toshiaki Minaki, both of Yokohama; Kentaro Mori, Tokyo, all of Japan

[73] Assignee: Nippon Asbestos Company, Ltd., Tokyo, Japan

[22] Filed: May 21, 1973

[21] Appl. No.: 362,503

[30] Foreign Application Priority Data
June 9, 1972 Japan.............................. 47-56836
Dec. 27, 1972 Japan.............................. 47-129999

[52] U.S. Cl. ...................... 106/50; 106/52; 106/54
[51] Int. Cl. ............................................. C03c 3/04
[58] Field of Search ................ 106/50, 52, 54; 65/3

[56] References Cited
UNITED STATES PATENTS

| | | | |
|---|---|---|---|
| 3,007,806 | 11/1961 | Hartwig ................................ | 106/50 |
| 3,044,888 | 7/1962 | Provance ............................. | 106/50 |
| 3,069,773 | 12/1962 | Saffir ................................. | 106/50 X |
| 3,736,162 | 5/1973 | Chvalovsky et al............ | 106/50 UX |

OTHER PUBLICATIONS

Kirk–Othmer, Encyclopedia of Chem. Technology 22 (1970), Wiley and Sons, N.Y., p. 653 TP9.E68

*Primary Examiner*—Winston A. Douglas
*Assistant Examiner*—John F. Niebling
*Attorney, Agent, or Firm*—Wenderoth, Lind & Ponack

[57] ABSTRACT

This invention provides alkali resistant glassy fibers which are remarkably improved in alkali resistance in comparison with the known glassy fibers.

This invention also provides a method for the manufacture of such alkali resistant glassy fibers.

Further this invention provides molded articles containing the alkali resistant glassy fibers of the invention as reinforcing material.

It is noted that the alkali resistant glassy fibers of this invention comprise as principal components silicon dioxide ($SiO_2$), aluminum oxide ($Al_2O_3$), zirconium oxide ($ZrO_2$) and magnesium oxide (MgO) in the presence or absence of additional component or components.

2 Claims, No Drawings

ALKALI RESISTANT GLASSY FIBERS

DETAILED EXPLANATION OF THE INVENTION

This invention relates to alkali resistant glassy fibers, a method for the manufacture of such alkali resistant glassy fibers and molded articles containing such alkali resistant glassy fibers as reinforcing material which are remarkably improved in alkali resistance in comparison with known glassy fibers.

In manufacturing the alkali resistant glassy fibers, the method of this invention has the characteristic merits in that the alkali resistant glassy fibers can be produced cheaply and in large quantities in the same manner as in a blowing method or a spinner method by which rock fibers and ceramic fibers are produced by using an electric furnace or a gas furnace in which a raw material is heated to a molten mass. Such a blowing method or such a spinner method is comparable to a drawing method in which a busing is used for the manufacture of the known long glassy fibers.

Heretofore, asbestos fibers have been used as reinforcing material for the manufacture of asbestos and silica and calcium-containing mold articles such as boards and heat insulators which have relatively high alkali resistance because the asbestos fibers are crystalloid, chemically stable and only slightly decreasing in strength in comparison with the known glassy fibers when incorporated with an alkaline material. Another reason is that a suitable reinforcing material, which can be used in place of the asbestos fibers, has not yet been found in the industrial field.

Now, there is growing a tendency in recent years toward a decrease in the production of asbestos of good quality and low price. Also, in carrying out the manufacture of the astestos fibers, astestos is cut into flying fine fibers which are harmful to health and therefore environment pollution becomes a social problem awaiting solution. Such being the case, there is an increasing desire to have inorganic fibers which can be used in place of the asbestos fibers. However, such an inorganic fiber, which has alkali resistance and is not affected by the alkali-hydrothermal reaction, was not found until this invention was developed and hence this is the reason why the conventional asbestos fibers are still in use as they were before.

Now, the inventors have investigated for inorganic fibers which can be used in place of the asbestos fibers and found that certain alkali resistant glassy fibers have hydrothermal resistance and are superior in quality in comparison with the known inorganic fibers other than the asbestos fibers.

An object of this invention is to provide alkali resistant glassy fibers comprising as principal components silicon oxide ($SiO_2$), aluminum oxide ($Al_2O_3$), zirconium oxide ($ZrO_2$) and magnesium oxide (MgO).

A further object of this invention is to provide a method for the manufacture of alkali resistant glassy fibers comprising as principal components silicon oxide ($SiO_2$), aluminum oxide ($Al_2O_3$), zirconium oxide ($ZrO_2$) and magnesium oxide (MgO).

Still further object of this invention is to provide calcium silicate - containing molded articles, cement-containing molded articles and gypsum-containing molded articles in which the alkali resistant glassy fibers are incorporated as reinforcing material.

The principal components used in accordance with this invention are illustrated as follows:

i. A $SiO_2$ component is used as the network former and it is preferable to use the $SiO_2$ component in an amount ranging from 35 to 50% by weight on the basis of the composition of fibers. When the $SiO_2$ component is used in an amount of above 50% by weight, it usually results in reduction of the yield of fibers as the viscosity of the melt increases over that required for drawing the melt into fibers, and also it is difficult to produce fibers having good quality, as the fibers are increased in diameter. When the $SiO_2$ component is used in an amount of below 35% by weight, the yield of fibers is remarkably reduced.

ii. An $Al_2O_3$ component and a MgO component act to increase the corrosion resistance of fibers and to control the viscosity of the melt. Also, they act to improve the fusibility of components when an electric furnace is used for melting the components as the melt is increased in electroconductivity.

The $Al_2O_3$ component is used in an amount ranging from 25 to 45% by weight on the basis of the composition of fibers. It has been found that it is not preferable to use the $Al_2O_3$ component in an amount of above 45% by weight as a higher temperature is required for melting the components and the yield of fibers is reduced. As to the MgO component, it has been found that it is preferable to use the MgO component in an amount ranging from 3 to 20% by weight on the basis of the composition of fibers.

iii. The $ZrO_2$ component acts to improve corrosion resistance against an alkaline substance such as sodium hydroxide or calcium hydroxide and also to improve the quality of fibers so that the fibers have a silky glass quality and are soft. It is preferable to use the $ZrO_2$ component in an amount ranging from 7 to 19% by weight on the basis the composition of fibers. When the $ZrO_2$ component is used in an amount of above 19%, the component tends to crystallize upon blowing or spinning the melt into fibers and therefore the fibers become stiff and are reduced in strength. Also, when the component is used in an amount of below 7%, the resulting fibers are reduced in corrosion resistance, especially alkali resistance and therefore they are difficult in practical use.

Consequently, it is noted that it is preferable to use 35 to 50% by weight of $SiO_2$, 25 to 45% by weight of $Al_2O_3$, 7 to 19% by weight of $ZrO_2$ and 3 to 20% by weight of MgO and also that is is more preferable to use 40 to 45% by weight of $SiO_2$, 25 to 35% by weight of $Al_2O_3$, 10 to 15% by weight of $ZrO_2$ and 5 to 10% by weight of MgO.

Now, the inventors have found that some fusing agents may be used as additional components, i.e. in addition to the principal components as mentioned above, in order to maintain viscosity and a working temperature of the melt suitable for blowing the melt into fibers in large quantities.

It is noted that the fusing agents include an effective amount up to 7% by weight of alkali metal oxides such as $Na_2O$ and $K_2O$, an effective amount up to 5% by weight of boric acid anhydride, an effective amount up to 5% by weight of an alkaline earth metal oxide other than magnesium oxide (MgO) and an effective amount up to 5% by weight of calcium fluoride. Also it is noted that the fusing agents act to reduce the heat resisting property of the resultant fibers and therefore the fusing agents can not be used in a large amount outside the ranges as mentioned above.

This invention is illustrated by the following Examples by referring to physical properties of the heat insulators which are made of calcium silicate in combination with the alkali resistant glassy fibers of this invention or other fibers such as the asbestos fiber and glass fiber and the like.

EXAMPLE 1

A mixture of silica stone, alumina, zircon sand and magnesia clinker was charged and melted in an electric furnace to form a melt so that the melt has the chemical composition of 48% $SiO_2$, 31% $Al_2O_3$, 16% $ZrO_2$ and 5% MgO and then the melt was guided into outside the electric furnace in the state of a small stream having a size of 5 millimeters in diameter, followed by blowing under the steam pressure of 8.5 kg/cm² to produce alkali resistant glassy fibers having an average size of 5.5 $\mu$ in diameter and about 30 millimeters in length, and the same chemical composition as that of the melt.

The resulting fibers (8 weight parts) were mixed with 1000 weight parts of water with agitation to produce a homogeneous dispersion and then the dispersion was mixed with 40 weight parts of diatomaceous earth, 40 weight parts of slaked lime and 12 weight parts of bentonite to produce a homogeneous slurry. The slurry was heated at 90°C for about 2 hours to form a gel and then the gel was dehydrated and molded into a formed product. The formed product was subjected to a hydrothermal treatment in an autoclave for 7 hours in the atmosphere of saturated steam thereby to cause a hardening reaction. The formed product thus hydrothermally treated was dried to produce a calcium silicate-containing heat insulator.

The heat insulator was tested for specific gravity, bending strength at the ordinary state and bending strength after it was heated at 650°C. The test results are given in the following Table 1.

Also, Example 1 was repeated with the exception that the alkali resistant glassy fibers were replaced with S-33-65 asbestos fibers, C-glass fibers, E-glass fibers or silica-alumina type ceramic fibers. The resulting heat insulators were tested for specific gravity and bending strength as in Example 1. The test results are given in the following Table 1.

It is noted in Table 1 that the S-33-65 asbestos fibers are natural rock fibers having grey, yellow or brown appearance, chemical composition of 49 to 53% $SiO_2$, 1 to 7% MgO, 34 to 44% FeO, 2 to 9% $Al_2O_3$, 2 to 5% $H_2O$ and 0.5 to 2.5% CaO + $Na_2O$, tensile strength of 150 to 250 kg/mm², alkali resistance of above 90% and strength-maintenance of below 10% after heated at 650°C for 3 hours; the C-glass fibers are highly resistant against chemicals, especially acids, usable for making a separator of a storage battery, a retainer or a filter cloth and have chemical composition of 65.0% $SiO_2$, 4.0% $Al_2O_3$, 14.0% CaO, 8.0% $Na_2O$, 1.0% $K_2O$, 3.0% MgO and 5.0 % $B_2O_3$; and the E-glass fibers are superior in electric properties and heat resistance, used for making an electric device, an artistic glass fabric and reinforcing material, and have chemical composition of 54.0% $SiO_2$, 15.0% $Al_2O_3$, 17.0% CaO, 0.6% $Na_2O$, 5.0% MgO and 8.0% $B_2O_3$.

EXAMPLE 2

A mixture of silica stone, alumina, zircon sand and magnesia clinker was charged and melted in an electric furnace to form a melt so that the melt has the chemical composition of 35% $SiO_2$, 35% $Al_2O_3$, 15% $ZrO_2$ and 15% MgO and then the melt was used for the manufacture of alkali resistance glassy fibers having the same chemical composition as that of the melt and an average size of 4.6 $\mu$ in diameter and 20 millimeters in length in the same manner as in Example 1 with the exception that the melt was blown under the steam pressure of 5 kg/cm².

The resulting fibers were used to produce a calcium silicate-containing heat insulator in the same manner as in Example 1 and it was found that the heat insulator has specific gravity of 0.22 g/cm³, bending strength of 7.0 kg/cm² at the ordinary state and bending strength of 4.1 kg/cm² after heated at 650°C and also that the fibers are excellent reinforcing material.

EXAMPLE 3

Example 1 was repeated to produce alkali resistant glassy fibers having an average size of 5.2 $\mu$ in diameter and 25 millimeters in length in the same manner as in Example 1 with the exception that the melt and fibers Table 1

| | Heat insulators containing | | | | |
|---|---|---|---|---|---|
| | Alkali resistant glassy fibers of this invention | S-33-65 asbestos fibers | C-glass fibers (9$\mu$ in diameter) | E-glass fibers (7$\mu$ in diameter) | Silica-alumina type ceramic fibers (4$\mu$ in diameter) |
| Specific gravity (g/cm³) | 0.20 | 0.20 | 0.24 | 0.22 | 0.25 |
| Bending strength (kg/cm²) at the ordinary state | 7.6 | 7.5 | 2.4 | 1.8 | 2.5 |
| Bending strength (kg/cm²) after heated at 650°C | 4.2 | 1.3 | 1.1 | 0.8 | 1.3 |

It is obvious from the data as shown in Table 1 that the heat insulator manufactured by using the alkali resistant glassy fibers as the reinforcing material in accordance with this invention is superior to the heat insulator manufactured by using the S-33-65 asbestos fibers and also that the former insulator is remarkably superior to the heat insulator manufactured by using the C-glass fibers, E-glass fibers or silica-alumina type ceramic fibers.

had the chemical composition of 40% $SiO_2$, 45% $Al_2O_3$, 5% MgO and 10% $ZrO_2$.

The resultant fibers were used to produce a silica and calcium-containing heat insulator in the same manner as in Example 1, and it was found that the heat insulator has specific gravity of 0.20 g/cm³, bending strength of 7.7 kg/cm² at the ordinary state and bending strength of 4.4 kg/cm² after heated at 650°C, and also that the fibers are excellent reinforcing material.

EXAMPLE 4

Example 1 was repeated to produce alkali resistant glassy fibers having an average size of 5 μ in diameter and 30 millimeters in length in the same manner as in Example 1 with the exception that the melt and fibers had chemical composition of 40% $SiO_2$, 25% $Al_2O_3$, 20% MgO and 15% $ZrO_2$, and the melt was blown under the steam pressure of 5 kg/cm².

The resultant fibers were used to produce a calcium silicate-containing heat insulator in the same manner as in Example 1 and it was found that the heat insulator has specific gravity of 0.23 g/cm³, bending strength of 7.6 kg/cm² at the ordinary state and bending strength of 4.4 kg/cm² after heated at 650°C and also that the fibers are excellent reinforcing material.

EXAMPLE 5

Example 1 was repeated to produce alkali resistant glassy fibers having an average size of 6 μ in diameter and 25 millimeters in length by using silica stone, alumina, zircon sand, magnesia clinker, soda ash and borax in the same manner as in Example 1 with the exception that the melt and fibers had the chemical composition of 40% $SiO_2$, 25% $Al_2O_3$, 19% $ZrO_2$, 11% MgO, 3% $Na_2O$ and 2% $B_2O_3$, and the melt was blown under the steam pressure of 5 kg/cm².

The resultant fibers were used to produce a calcium silicate-containing heat insulator in the same manner as in Example 1 and it was found that the heat insulator has specific gravity of 0.21 g/cm³, bending strength of 7.3 kg/cm² at the ordinary state and bending strength of 4.5 kg/cm² after heated at 650°C, and also that the fibers are superior to the asbestos fibers.

EXAMPLE 6

Example 1 was repeated to produce alkali resistant glassy fibers having a size of from 3 to 8 μ in diamter and 25 millimeters in mean length by using silica stone, alumina, zircon sand, magnesia clinker, soda ash, borax and fluorspar in the same manner as in Example 1 with the exception that the melt and fibers had the chemical composition of 49.5% $SiO_2$, 25% $Al_2O_3$, 4.5% MgO, 18.0% $ZrO_2$, 1.2% $Na_2O$, 1.5% $CaF_2$ and 0.3% $B_2O_3$ and the melt was blown under the steam pressure of 10 kg/cm².

The resultant fibers were subjected to a hydrothermal treatment in an autoclave, in which a saturated lime solution was charged, at the pressure of 10 kg/cm² for 10 hours and it was found that the fibers have tensile strength of 95 kg/mm² and they are not degraded in tensile strength as compared with tensile strength measured at the ordinary state. On the contrary, E-glass fibers and C-glass fibers were observed to have tensile strength of 5 kg/mm² and 15 kg/mm² respectively after they were subjected to the hydrothermal treatment in the same manner as mentioned above even if they have tensile strength of 120 kg/mm² and 80 kg/mm² respectively measured at the ordinary state.

EXAMPLE 7

A mixture of silica stone, alumina, zircon sand, magnesia, soda ash, fluorspar and borax was charged and melted in an electric furnace so as to form a melt having the chemical composition of 35.5% $SiO_2$, 35.5% $Al_2O_3$, 7.3% MgO, 19.0% $ZrO_2$, 2.0% $Na_2O$, 0.5% $CaF_2$ and 0.2% $B_2O_3$, and the melt was blown under the steam pressure of 8 kg/cm² in the same manner as in the known spinner method to produce alkali resistant glassy fibers having a size of from 5 to 9 μ in diameter and 50 millimeters in mean length, and the same chemical composition as that of the melt.

The resultant fibers were used to produce a calcium silicate-containing heat insulator in the same manner as in Example 1 and it was found that the heat insulator has specific gravity of 0.19 g/cm³ and bending strength of 10.1 kg/cm² measured at the ordinary state and also that the heat insulator can be used for an excellent heat insulating material.

The typical alkali resistant glassy fibers and their chemical compositions of this invention are explained in Examples 1 to 7 but it should be noted that this invention includes other alkali resistant glassy fibers modified in chemical compositions and therefore that the characteristic properties of the alkali resistant glassy fibers of this invention are summarized as that they are white and bulky in appearance, and have an average size of 3 to 9 μ in diameter and 20 to 50 millimeters in length, tensile strength of 120 kg/mm² measured after being immersed in a slurry of calcium silicate and then hydrothermally treated in an autoclave, alkali resistance of above 90%, strength-maintenance of above 70% after heated at 650°C for 3 hours and shape-maintaining temperature of 900°C. Therefore, such alkali resistant glassy fibers of this invention can be used as reinforcing material for reinforcing concrete articles, gypsum articles and also they can be used in the fields of the building and ceramic industries in which natural asbestos are earnestly desired.

We claim:

1. An alkali-resistant glassy fiber usable as a reinforcing material in calcium silicate-containing molded articles and cement- or gypsum-containing molded articles, which consists essentially of 35 to 50% by weight of $SiO_2$, 25 to 45% by weight of $Al_2O_3$, 10 to 19% by weight of $ZrO_2$ and 3 to 20% by weight of MgO.

2. An alkali-resistant glassy fiber usable as a reinforcing material in calcium silicate-containing molded articles and cement- or gypsum-containing molded articles, which consists essentially of 35 to 50% by weight of $SiO_2$, 25 to 45% by weight of $Al_2O_3$, 10 to 19% by weight of $ZrO_2$, 3 to 20% by weight of MgO, an effective amount of up to 7% by weight of $Na_2O$ and/or $K_2O$, an effective amount of up to 5% by weight of boric acid anhydride, an effective amount of up to 5% by weight of an alkaline earth metal oxide other than MgO and an effective amount of up to 5% by weight of calcium fluoride.

* * * * *